United States Patent
Onut et al.

(10) Patent No.: US 11,277,443 B2
(45) Date of Patent: Mar. 15, 2022

(54) DETECTION OF PHISHING INTERNET LINK

(71) Applicant: International Business Machines Corporation, Armonk, NY (US)

(72) Inventors: Iosif Onut, Ottawa (CA); Qian Cui, Ottawa (CA); Guy-Vincent Jourdan, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/660,232

(22) Filed: Oct. 22, 2019

(65) Prior Publication Data

US 2021/0120035 A1    Apr. 22, 2021

(51) Int. Cl.
*H04L 9/00* (2006.01)
*H04L 29/06* (2006.01)

(52) U.S. Cl.
CPC ...... *H04L 63/1483* (2013.01); *H04L 63/1416* (2013.01); *H04L 63/1425* (2013.01); *H04L 63/1433* (2013.01); *H04L 63/1475* (2013.01)

(58) Field of Classification Search
CPC ............. H04L 63/1483; H04L 63/1416; H04L 63/1433; H04L 63/1475; H04L 63/1425
USPC .......................................................... 726/22
See application file for complete search history.

(56) References Cited

U.S. PATENT DOCUMENTS

| | | | |
|---|---|---|---|
| 8,631,498 B1* | 1/2014 | Hart | H04L 63/145 726/25 |
| 8,707,426 B1* | 4/2014 | Ramzan | H04L 63/1483 726/22 |
| 9,282,117 B2* | 3/2016 | Schmidtler | G06F 21/577 |
| 9,979,748 B2* | 5/2018 | O'Connor | H04L 63/145 |
| 10,686,750 B2* | 6/2020 | Daryani | G06F 40/205 |
| 2003/0115040 A1* | 6/2003 | Xing | H04L 29/12066 704/8 |
| 2010/0057439 A1* | 3/2010 | Ideuchi | G06F 40/42 704/7 |

(Continued)

OTHER PUBLICATIONS

The Methodology and an Application to Fight against Unicode Attacks, Anthony Y. Fu, Xiaotei Deng, SOUPS Jul. 12-14, 2006; pp. 1-11 (Year: 2006).*

(Continued)

*Primary Examiner* — Christopher J Brown
(74) *Attorney, Agent, or Firm* — Troutman Pepper Hamilton Sanders LLP (57) ABSTRACT

Embodiments provide a computer implemented method for detecting a phishing internet link, wherein an internet link is a Uniform Resource Locator (URL) or a domain name, the method including: receiving the internet link; replacing one or more visually confusing characters with one or more original characters, wherein the one or more visually confusing characters are similar to the one or more original characters; removing a top-level domain from the internet link; removing a common subdomain from the internet link; splitting the remaining internet link into a list of words; converting the list of words into a list of word vectors; calculating an average word vector of the list of word vectors; and providing a phishing score for the average vector, indicating a probability of the internet link being a phishing internet link.

15 Claims, 6 Drawing Sheets

(56) References Cited

U.S. PATENT DOCUMENTS

| | | | | |
|---|---|---|---|---|
| 2012/0230590 | A1* | 9/2012 | Zhang | H04N 1/00331 |
| | | | | 382/195 |
| 2017/0085588 | A1* | 3/2017 | Laidlaw | H04L 63/1425 |
| 2017/0295187 | A1 | 10/2017 | Havelka et al. | |
| 2019/0384856 | A1* | 12/2019 | Liu | G06F 16/3334 |
| 2020/0036751 | A1* | 1/2020 | Kohavi | H04L 63/1425 |
| 2020/0098366 | A1* | 3/2020 | Chakraborty | G10L 15/1815 |

OTHER PUBLICATIONS

Marchal S., François J., State R., Engel T. (2012) Proactive Discovery of Phishing Related Domain Names. In: Balzarotti D., Stolfo S.J., Cova M. (eds) Research in Attacks, Intrusions, and Defenses. RAID 2012. Lecture Notes in Computer Science, vol. 7462. Springer, Berlin, Heidelberg.

Zhao, Hong & Chang, Zhaobin & Bao, Guangbin & Zeng, Xiangyan. (2019). Malicious Domain Names Detection Algorithm Based on N-Gram. Journal of Computer Networks and Communications. 2019. 1-9. 10.1155/2019/4612474.

Zipf, G. K. (1949) Human Behavior and the Principle of Least Effort: An Introduction to Human Ecology. Addison-Wesly Press, Inc. Retrieved from the Internet: https://ia801900.us.archive.org/27/items/in.ernet.dli.2015.90211/2015.90211.Human-Behavior-And-The-Principle-Of-Least-Effort.pdf [retrieved on Oct. 22, 2019].

Unicode Technical Reports. Unicode Technical Standard #39: Unicode Security Mechanisms. (2019). Retrieved from the Internet: www.unicode.org/reports/tr39 [retrieved on Jun. 11, 2019].

\* cited by examiner

FIG. 1

| Word | Frequency rank | Occurrence probability |
|---|---|---|
| the | 1 | 0.50 |
| of | 2 | 0.25 |
| in | 3 | 0.17 |
| a | 4 | 0.13 |
| and | 5 | 0.10 |
| is | 6 | 0.08 |
| to | 7 | 0.07 |
| was | 8 | 0.06 |
| it | 9 | 0.06 |
| for | 10 | 0.05 |

DETECTION OF PHISHING INTERNET LINK

TECHNICAL FIELD

The present disclosure relates generally to a system, method, and computer program product that can detect a phishing internet link, e.g., a phishing domain or a phishing Uniform Resource Locator (URL).

BACKGROUND

The phishing attacks are attacks which impersonate a legitimate website to steal sensitive information from end-users. Currently, the phishing attacks can be detected after analyzing the content of a suspicious website and comparing the suspicious site with either other phishing attacks or with the legitimate site which the suspicious site impersonates. However, the analysis and comparison require a relatively long computational time, thus making it impossible to check every single website or URL.

SUMMARY

Embodiments provide a computer implemented method in a data processing system comprising a processor and a memory comprising instructions, which are executed by the processor to cause the processor to implement the method for detecting a phishing internet link, wherein an internet link is a Uniform Resource Locator (URL) or a domain name, the method comprising: receiving, by the processor, the internet link; replacing, by the processor, one or more visually confusing characters with one or more original characters, wherein the one or more visually confusing characters are similar to the one or more original characters; removing, by the processor, a top-level domain from the internet link; removing, by the processor, a common sub-domain from the internet link; splitting, by the processor, the remaining internet link into a list of words; converting, by the processor, the list of words into a list of word vectors; calculating, by the processor, an average word vector of the list of word vectors; and providing, by the processor, a phishing score for the average vector, indicating a probability of the internet link being a phishing internet link.

Embodiments further provide a computer implemented method, further comprising: removing, by the processor, a protocol path from the internet link, wherein the internet link is the URL.

Embodiments further provide a computer implemented method, further comprising: splitting, by the processor, the remaining internet link into a list of words based on a Zipf's law.

Embodiments further provide a computer implemented method, wherein a divide-and-conquer algorithm is applied to split the remaining internet link into the list of words, so that a sum of an occurrence probability of each word is maximized.

Embodiments further provide a computer implemented method, wherein the Zipf's law obtains an occurrence probability of each word from a frequency table, wherein the frequency table includes occurrence probabilities of a plurality of words appearing in a text corpus.

Embodiments further provide a computer implemented method, wherein the text corpus is Wikipedia corpus.

Embodiments further provide a computer implemented method, further comprising: converting, by the processor, the list of words into the list of word vectors through an unsupervised learning algorithm GloVe.

In another illustrative embodiment, a computer program product comprising a computer usable or readable medium having a computer readable program is provided. The computer readable program, when executed on a processor, causes the processor to perform various ones of, and combinations of, the operations outlined above with regard to the method illustrative embodiment.

In yet another illustrative embodiment, a system is provided. The system may comprise a processor configured to perform various ones of, and combinations of, the operations outlined above with regard to the method illustrative embodiment.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

According to embodiments disclosed herein, a method, system, and computer product of detecting suspicious phishing internet links (domain or URL) are provided. In an embodiment, a ranking algorithm which combines natural language processing and machine learning techniques is provided to prioritize the internet links that are most likely to be harmful. The method of detecting suspicious phishing internet links provided herein is light weight and fast, because analysis of the content of each suspicious website and comparison for each website are not required.

Figure 1:
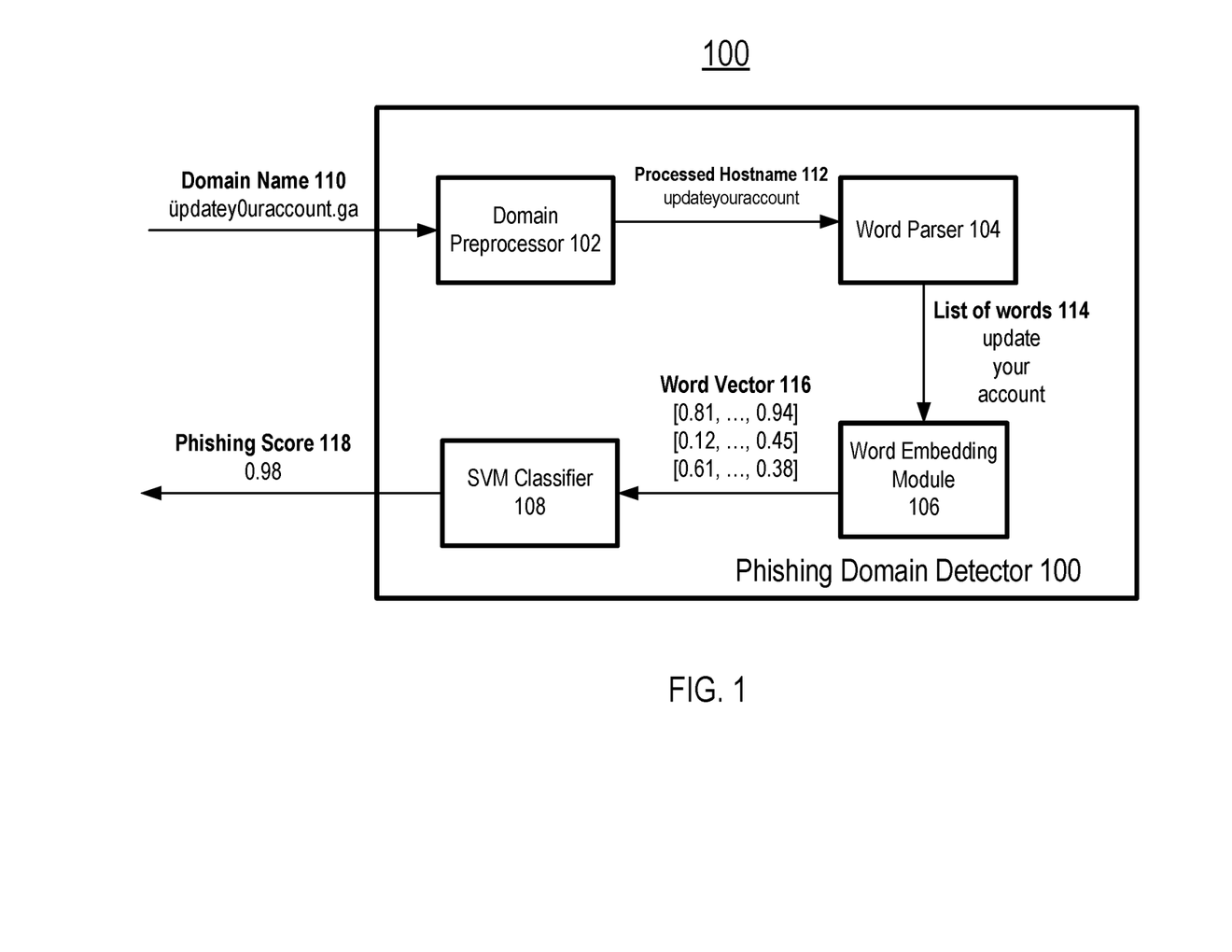
FIG. 1 is a diagram depicting an architecture of phishing domain detector 100, according to embodiments provided herein.

FIG. 1 is a diagram depicting an architecture of phishing domain detector 100, according to embodiments provided herein. The phishing domain detector 100 includes four components: domain preprocessor 102, word parser 104, word embedding module 106, and SVM classifier 108. The domain name 110, e.g., "üpdatey0uraccount.ga" is input into the domain preprocessor 102. In an embodiment, in order to detect homograph attacks (i.e., using similar-looking non-English words to create domains similar to a legitimate domain), the domain preprocessor 102 replaces one or more similar non-English characters (lookalike but wrong characters) with one or more original characters (correct characters). A list of similar non-English characters and the corresponding correct English character for each similar non-English character are provided by Unicode® Technical Standard (UTS). For example, the character "0" of the domain name 110 is similar to the character "o" and replaced with the character "o." The character "ü" of the domain name 110 is similar to the character "u" and replaced with the character "u." In this embodiment, two non-English characters, i.e., "ü" and "0" are identified by the domain preprocessor 102. In an embodiment, the similar non-English character can be accent-based. For example, "ü," "û," or "ù," is similar to the character "u." In another embodiment, the similar non-English character can be a number. For example, the number "0" is similar to the character "o" and the number "1" is similar to the character "l." In another embodiment, the similar non-English character can be a letter from a different alphabet that looks like an English alphabet. For example, the similar non-English character is a Cyrillic or a Turkish letter. The UTS lists a large number of non-English characters and the corresponding correct English word for each similar non-English character. The domain preprocessor 102 can identify one or more non-English characters in the domain name 110, and then look up each identified non-English character in the UTS, so as to obtain the corresponding correct English character. The domain preprocessor 102 can then replace each identified non-English character in the domain name 110 with the obtained correct English character. In an embodiment, the domain name 110 can be in another language, for example, French, German, Spanish, Arabic, Chinese, etc. The domain preprocessor 102 can identify one or more, e.g., non-German characters in the domain name 110, and replace each identified non-German character in the domain name 110 with the correct German character. The same principle also applies to other languages, for example, French, Spanish, Arabic, Chinese, etc.

In an embodiment, the domain preprocessor 102 further removes a top-level domain (e.g., ".ga," ".com," ".cn," etc.) of the domain name 110 and a common subdomain name, such as "www," "mail," "cpanel," "webmail," "webdisk," etc., which does not have meaningful semantics for the domain analysis. The rest of domain name 110 (i.e., the processed hostname 112), e.g., "updateyouraccount" is input to the word parser 104.

Figure 2:
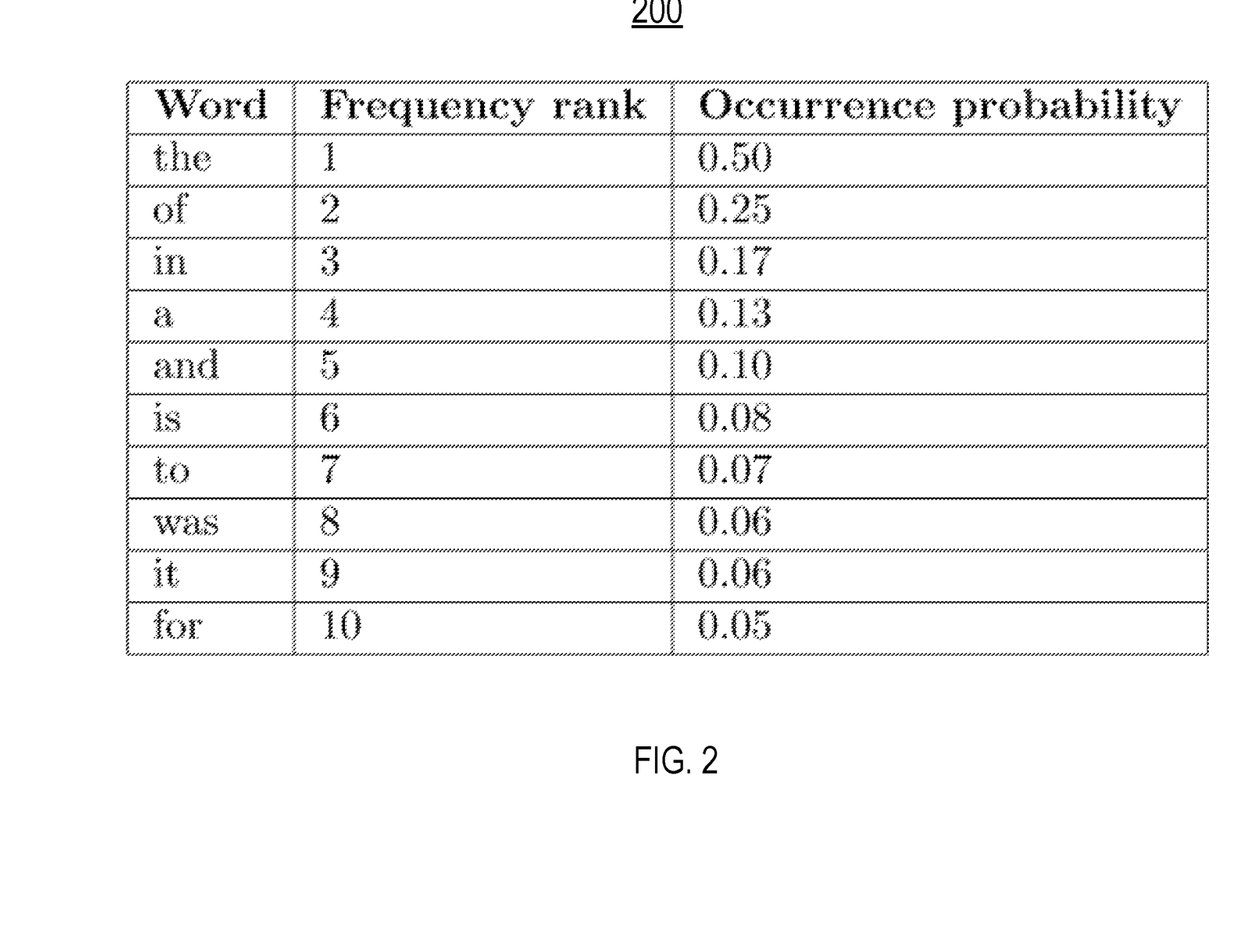
FIG. 2 depicts a frequency table 200 having top 10 words, which are sorted in a descending order by frequency, according to embodiments provided herein.

The word parser 104 applies a divide-and-conquer algorithm to split the processed hostname 112 into a list of words 114 based on Zipf's law. The Zipf's law captures the probability of occurrence of a word based on its rank in a given frequency table (i.e., the frequency of any word is inversely proportional to its rank in the frequency table). The frequency table is generated by counting the frequency of words appearing in a large text corpus (e.g., Wikipedia webpages) and sorting the words in a descending order by frequency. The frequency table includes words (each word is a unigram), a frequency rank of each word, and an occurrence probability of each word. As an example, FIG. 2 depicts a frequency table 200 having top 10 words, which are sorted in a descending order by frequency. As shown in FIG. 2, the higher the rank in the frequency table 200, the higher the probability of occurrence. The Zipf's law can be expressed as: prob(w)=1/(n*log(N)), where prob(w) is the occurrence probability of word "w," "n" is the rank of the word "w" in the frequency table, and "N" is the total number of words in the frequency table 200.

In an embodiment, a divide-and-conquer algorithm is applied to split the processed hostname 112 into a plurality of words 114, while maximizing the sum of each word's occurrence probability. The divide-and-conquer algorithm works by recursively breaking down a problem into two or more sub-problems, until these sub-problems become simple enough to be solved directly. The solutions to the sub-problems are then combined to provide a solution to the original problem. For instance, given a string of n characters, $s=\{c_1, c_2, c_3, \ldots, c_n\}$, the divide-and-conquer algorithm splits the string into k words $\{w_1, w_2, w_3, \ldots, w_k\}$, where $\Sigma_{i=1}^{k} \text{prop}(w_i)$ is maximized. Consequently, the word parser 104 outputs a list of words 114, e.g., "update," "your," "account."

Word embedding module 106 can convert the list of words 114 into a list of word vectors 116. Word embedding provides a vector representation of a word, based on the context and semantic similarity with respect to other words. Word embedding is the collective name for a set of language modeling and feature learning techniques in natural language processing (NLP) where words or phrases from the vocabulary are mapped to vectors of real numbers. Words with similar meanings are close to each other in the vector space. For instance, the words "car" and "truck" have two similar vectors in the vector space, because they are two instances of the same category. Word embedding can also combine words by adding their vectors. For example, a string consisting of multiple words, has a vector generated by adding a vector of each word of that string. As an example, the vector of the string "update your account" is equal to the sum of the vectors of "update," "your," and "account." Thus, word embedding module 106 can be used to measure the semantic similarity of domain names. The word embedding module 106 can be pre-trained to convert the list of words 114 of each domain name into a list of word vectors 116. In an embodiment, an unsupervised learning algorithm for obtaining vector representations, e.g., GloVe, is integrated in the word embedding module 106 to convert the list of words 114 into a list of word vectors 116. GloVe can be pre-trained using a large number of texts from the internet, e.g., totaling about 2.2 million words. In an embodiment, an average vector is calculated as a representative vector representing the semantics of the domain name 110.

The average vector is processed by the SVM classifier 108, and a phishing score 118, e.g., from 0 to 1 for the semantical vector, is provided to measure the likelihood that the domain name 110 is a phishing domain. The phishing score 118 of "1" indicates the highest probability for the domain name 110 to be a phishing domain, while the phishing score 118 of "0" indicates the lowest probability for the domain name 110 to be a phishing domain.

The average vector is input into the SVM classifier 108, and the output of the SVM classifier 108 is a distance to the hyperplane, which is then converted to a classification probability using Platt scaling. Platt scaling is a method to transform the output of a classifier into probabilities. With Platt scaling, logistic regression is applied to the output of the SVM classifier 108 (i.e., distance to the hyperplane) to obtain the probabilities.

In an embodiment, the SVM classifier 108 can be pre-trained by, e.g., a dataset of 10,000 malicious domains and 20,000 legitimate domains that are randomly sampled from Alexa top 10,000 to top 1,000,000 domains. The higher the phishing score 118, the more likely for the domain name 110 to be a phishing domain.

Figure 3:
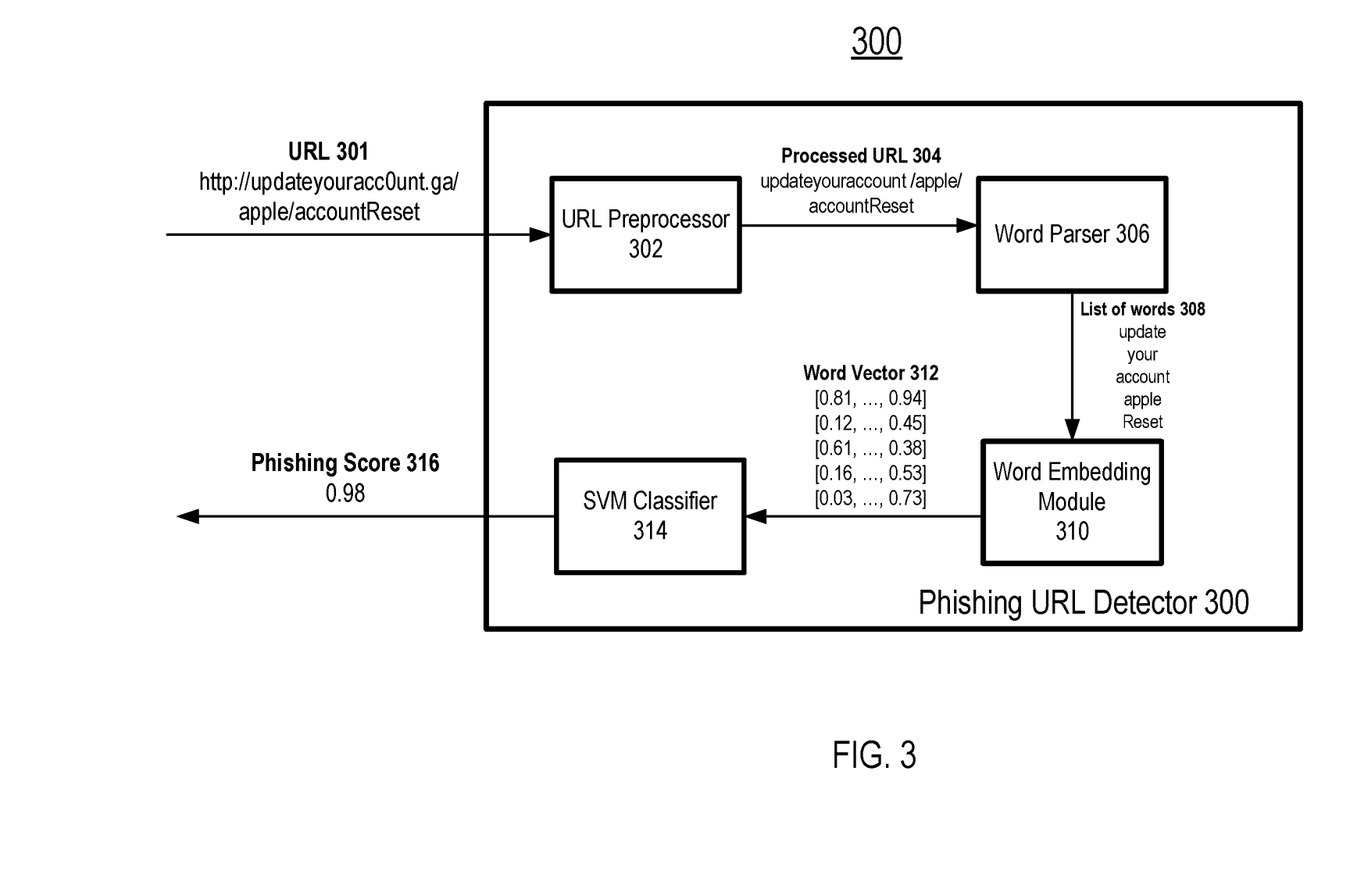
FIG. 3 is a diagram depicting an architecture of phishing URL detector 300, according to embodiments provided herein.

FIG. 3 is a diagram depicting an architecture of phishing URL detector 300, according to embodiments provided herein. In an embodiment, the URL 301, e.g., "http://updateyouracc0unt.ga/apple/accountReset" is input to the URL preprocessor 302. The URL preprocessor 302 replaces one or more visually confusing non-English characters (lookalike but wrong characters) with one or more original English characters (correct characters). A list of visually confusing non-English characters are provided by Unicode® Technical Standard (UTS). For example, the non-English character "0" of the URL 301 is replaced with the English character "o." In an embodiment, the URL preprocessor 302 further removes a protocol path (e.g., "http://"), a top-level domain (e.g., ".ga," ".com," ".cn," etc.), and a common subdomain name, such as "www," "mail," "cpanel," "webmail," "webdisk," etc., which does not have meaningful semantics for the domain analysis. The rest of URL 301 (i.e., the processed URL 304), e.g., "updateyouraccount/apple/accountReset" is input to the word parser 306 to obtain a list of words 308, e.g., "update," "your," "account," "apple," "account," "Reset." The word parser 306 and the word embedding module 310 of the phishing URL detector 300 are operating in a same manner as the word parser 104 and the word embedding module 106 of the phishing domain detector 100. The word embedding module 310 can be pre-trained to convert the list of words 308 into a list of word vectors 312. In an embodiment, the word embedding module 310 can also calculate an average vector of the list of word vectors 312. In an embodiment, the average vector is output by the word embedding module 310 and then processed by the trained SVM classifier 314 to obtain the phishing score 316. The SVM classifier 314 can be pre-trained by a large number of malicious URLs and legitimate URLs. The higher the phishing score 316, the more likely for the URL 301 to be a phishing URL.

Figure 4:
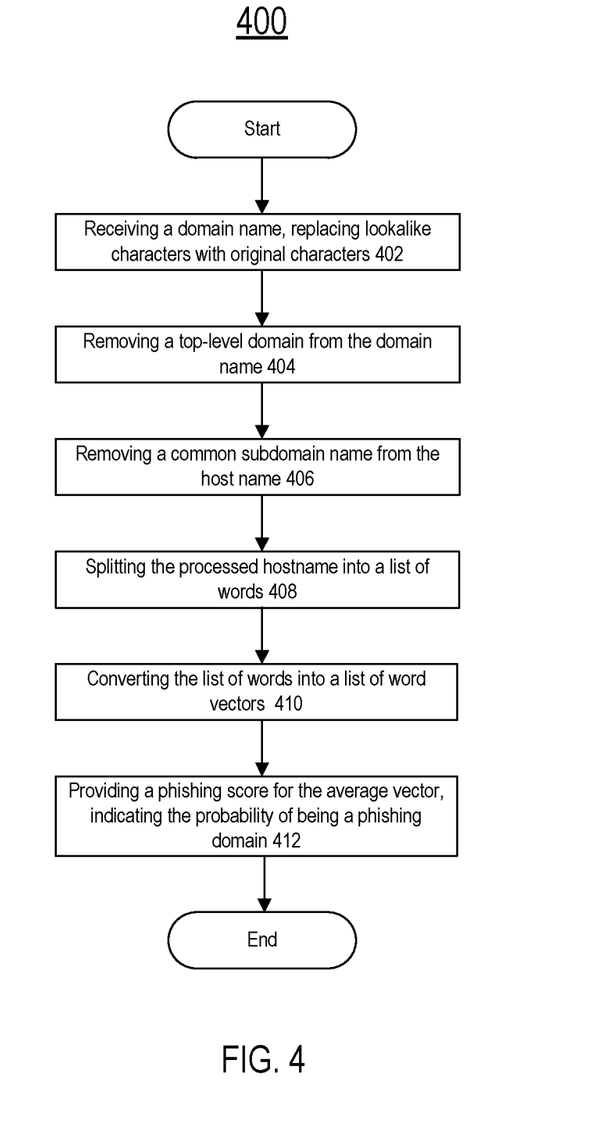
FIG. 4 is a flowchart illustrating a method 400 of detecting a phishing domain, according to embodiments provided herein.

FIG. 4 is a flowchart illustrating a method 400 of detecting a phishing domain, according to embodiments provided herein. In an embodiment, a domain name, e.g., "webmail.Ba6ystuff.com" is input to the phishing domain detector 100, and the phishing domain detector 100 decides whether the domain name is a phishing domain name or not. At step 402, the domain preprocessor 102 receives a domain name, e.g., "webmail.Ba6ystuff.com," and replaces one or more lookalike but wrong characters with one or more corresponding original characters. UTS can provide a list of lookalike characters, in relation to the original characters. For example, the character "6" is replaced with the character "b," and the domain name is thus changed to "webmail.Babystuff.com."

At step 404, the domain preprocessor 102 removes a top-level domain from the domain name. For example, ".com" is removed from "webmail.Babystuff.com," and the domain name is changed to "webmail.Babystuff," which is a hostname.

At step 406, the domain preprocessor 102 removes a common subdomain name from the hostname. For example, "webmail" is removed from "webmail.Babystuff," and the hostname is changed to "Babystuff" The "webmail" is a common subdomain name, and is semantically meaningless for domain analysis. The sequence of replacing wrong characters with correct characters, removing a top-level domain, and removing a common subdomain name can be random.

At step 408, the word parser 104 receives the processed hostname, e.g., "Babystuff," and splits the processed hostname into a list of words, e.g., "Baby" and "stuff." A divide-and-conquer algorithm is applied to split the processed hostname into a list of words based on Zipf's law.

At step 410, the word embedding module 106 converts the list of words into a list of word vectors. In an embodiment, an average vector is calculated. For example, the vector of "Baby" and the vector of "stuff" are averaged to obtain an average vector.

At step 412, the trained SVM classifier 108 provides a phishing score 118 for the average vector, indicating the probability of being a phishing domain. For example, a phishing score 118 of "0.9" is provided to indicate that the input domain name, e.g., "webmail.Ba6ystuff.com" is very possible to be a phishing domain.

Figure 5:
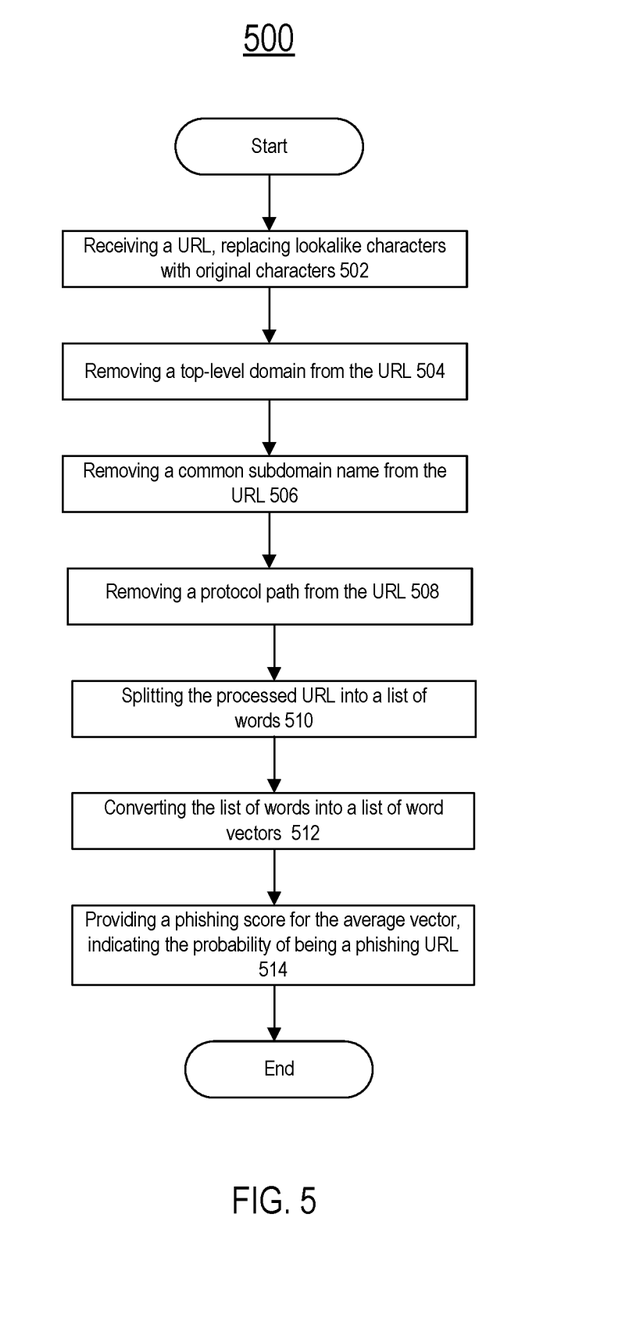
FIG. 5 is a flowchart illustrating a method 500 of detecting a phishing URL, according to embodiments provided herein.

FIG. 5 is a flowchart illustrating a method 500 of detecting a phishing URL, according to embodiments provided herein. The method of detecting a phishing URL (steps 502-506 and steps 510-514) is similar to the method of detecting a phishing domain (steps 402-412) as illustrated in FIG. 4. The main difference between these two methods is the step 508. At step 508, a protocol path (e.g., "http://") is removed from the URL.

Figure 6:
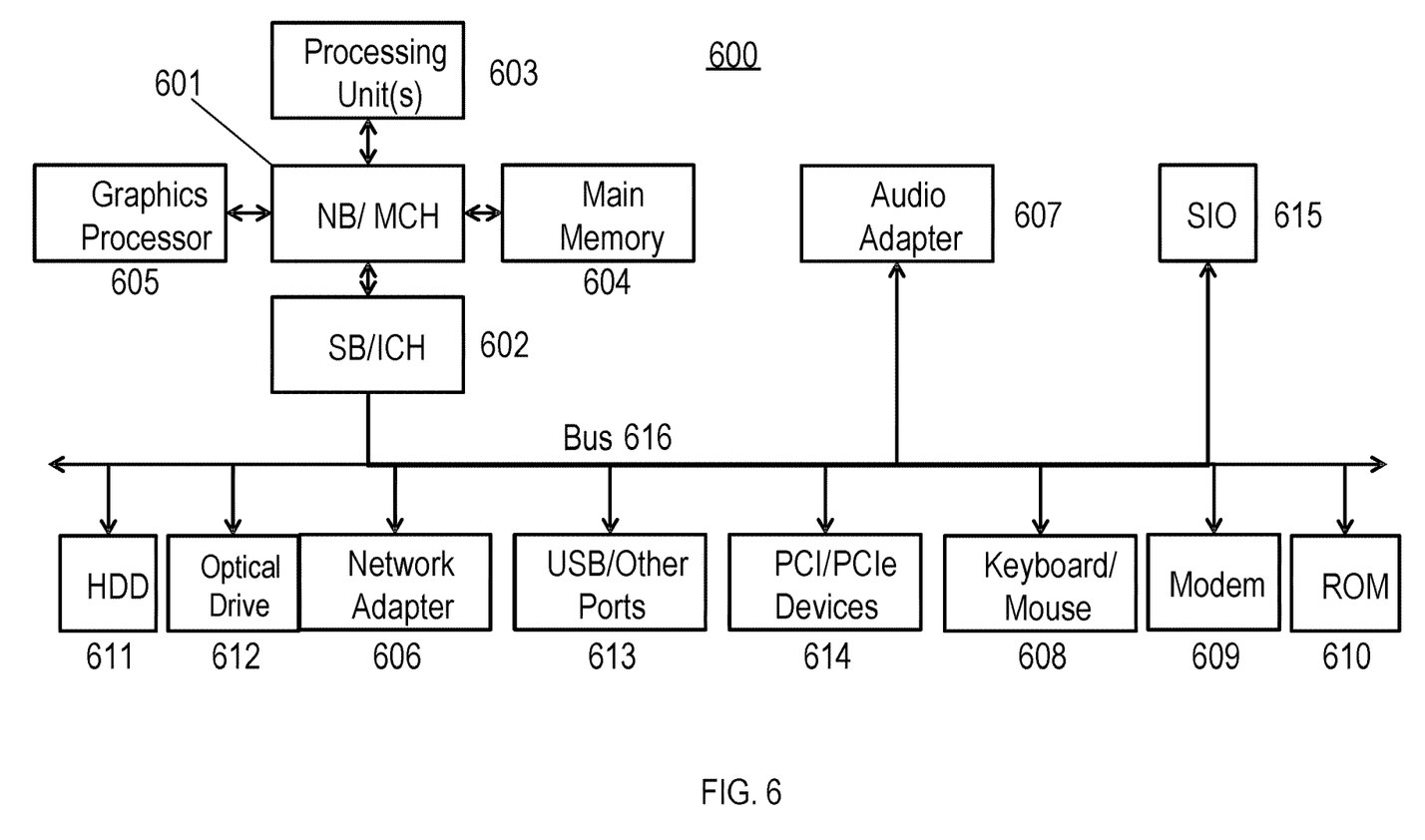
FIG. 6 is a block diagram of an example data processing system 600 in which aspects of the illustrative embodiments are implemented.

FIG. 6 is a block diagram of an example data processing system 600 in which aspects of the illustrative embodiments are implemented. Data processing system 600 is an example of a computer, such as a server or client, in which computer usable code or instructions implementing the process for illustrative embodiments of the present invention are located. In one embodiment, FIG. 6 represents e.g., a computer, a network security device, etc., which implements the phishing domain detector 100 or phishing URL detector 300 described herein.

In the depicted example, data processing system 600 can employ a hub architecture including a north bridge and memory controller hub (NB/MCH) 601 and south bridge and input/output (I/O) controller hub (SB/ICH) 602. Processing unit 603, main memory 604, and graphics processor 605 can be connected to the NB/MCH 601. Graphics processor 605 can be connected to the NB/MCH 601 through, for example, an accelerated graphics port (AGP).

In the depicted example, a network adapter 606 connects to the SB/ICH 602. An audio adapter 607, keyboard and mouse adapter 608, modem 609, read only memory (ROM) 610, hard disk drive (HDD) 611, optical drive (e.g., CD or DVD) 612, universal serial bus (USB) ports and other communication ports 613, and PCI/PCIe devices 614 may connect to the SB/ICH 602 through bus system 616. PCI/PCIe devices 614 may include Ethernet adapters, add-in cards, and PC cards for notebook computers. ROM 610 may be, for example, a flash basic input/output system (BIOS). The HDD 611 and optical drive 612 can use an integrated drive electronics (IDE) or serial advanced technology attachment (SATA) interface. A super I/O (SIO) device 615 can be connected to the SB/ICH 602.

An operating system can run on processing unit 603. The operating system can coordinate and provide control of various components within the data processing system 600. As a client, the operating system can be a commercially available operating system. An object-oriented programming system, such as the Java™ programming system, may run in conjunction with the operating system and provide calls to the operating system from the object-oriented programs or applications executing on the data processing system 600. As a server, the data processing system 600 can be an IBM® eServer™ System P® running the Advanced Interactive Executive operating system or the LINUX® operating system. The data processing system 600 can be a symmetric multiprocessor (SMP) system that can include a plurality of processors in the processing unit 603. Alternatively, a single processor system may be employed.

Instructions for the operating system, the object-oriented programming system, and applications or programs are located on storage devices, such as the HDD 611, and are loaded into the main memory 604 for execution by the processing unit 603. The processes for implementing a method of validating an internet link in an email body, described herein, can be performed by the processing unit 603 using computer usable program code, which can be located in a memory such as, for example, main memory 604, ROM 610, or in one or more peripheral devices.

A bus system 616 can be comprised of one or more busses. The bus system 616 can be implemented using any type of communication fabric or architecture that can provide for a transfer of data between different components or devices attached to the fabric or architecture. A communication unit such as the modem 609 or the network adapter 606 can include one or more devices that can be used to transmit and receive data.

Those of ordinary skill in the art will appreciate that the hardware depicted in FIG. 6 may vary depending on the implementation. Other internal hardware or peripheral devices, such as flash memory, equivalent non-volatile memory, or optical disk drives may be used in addition to or in place of the hardware depicted. Moreover, the data processing system 600 can take the form of any of a number of different data processing systems, including but not limited to, client computing devices, server computing devices, tablet computers, laptop computers, telephone or other communication devices, personal digital assistants, and the like. Essentially, data processing system 600 can be any known or later developed data processing system without architectural limitation.

The system and processes of the figures are not exclusive. Other systems, processes, and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 U.S.C. 112 (f), unless the element is expressly recited using the phrase "means for."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java™, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatuses (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present invention.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

We claim:

1. A computer implemented method in a data processing system comprising a processor and a memory comprising instructions, which are executed by the processor to cause the processor to implement the method for detecting a phishing internet link, wherein an internet link is a Uniform Resource Locator (URL) or a domain name, the method comprising:
   receiving, by the processor, the internet link;
   identifying, by the processor, one or more accent-based non-English characters in the internet link;
   looking up, by the processor, each identified accent-based non-English character in the Unicode Technical Standard (UTS) to obtain the corresponding correct English character;
   replacing, by the processor, each of the one or more accent-based non-English characters in the internet link with the corresponding correct English character;
   removing, by the processor, a top-level domain from the amended internet link;
   removing, by the processor, a common subdomain from the amended internet link;
   splitting, by the processor, the remaining internet link into a list of words;
   converting, by the processor, the list of words into a list of word vectors;
   calculating, by the processor, an average word vector of the list of word vectors; and
   providing, by the processor, a phishing score for the average vector, indicating a probability of the internet link being a phishing internet link,
   wherein the step of providing a phishing score for the average vector further comprises:
   inputting the average vector into an SVM classifier to output a distance to a hyperplane;
   converting the distance to the hyperplane to a classification probability using Platt scaling; and
   providing the phishing score based on the classification probability.

2. The method as recited in claim 1, further comprising:
   removing, by the processor, a protocol path from the amended internet link, wherein the amended internet link is the URL.

3. The method as recited in claim 1, further comprising:
   splitting, by the processor, the remaining internet link into a list of words based on a Zipf's law.

4. The method as recited in claim 3, wherein a divide-and-conquer algorithm is applied to split the remaining internet link into the list of words, so that a sum of an occurrence probability of each word is maximized.

5. The method as recited in claim 3, wherein the Zipf's law obtains an occurrence probability of each word from a frequency table, wherein each word is a unigram, wherein the frequency table includes occurrence probabilities of a plurality of words appearing in a text corpus.

6. The method as recited in claim 1, further comprising:
converting, by the processor, the list of words into the list of word vectors through an unsupervised learning algorithm GloVe.

7. A computer program product for detecting a phishing internet link, wherein an internet link is a Uniform Resource Locator (URL) or a domain name, the computer program product comprising a computer readable storage medium having program instructions embodied therewith, the program instructions executable by a processor to cause the processor to:
receive the internet link;
identify one or more accent-based non-English characters in the internet link;
look up each identified accent-based non-English character in the Unicode Technical Standard (UTS) to obtain the corresponding correct English character;
replace each of the one or more accent-based non-English characters in the internet link with the corresponding correct English character;
remove a top-level domain from the amended internet link;
remove a common subdomain from the amended internet link;
split the remaining internet link into a list of words;
convert the list of words into a list of word vectors;
calculate an average word vector of the list of word vectors; and
provide a phishing score for the average vector, indicating a probability of the internet link being a phishing internet link,
wherein the step of providing a phishing score for the average vector further configures the processor to:
input the average vector into an SVM classifier to output a distance to a hyperplane;
convert the distance to the hyperplane to a classification probability using Platt scaling; and
provide the phishing score based on the classification probability.

8. The computer program product of claim 7, wherein the program instructions executable by the processor further cause the processor to:
remove a protocol path from the internet link, wherein the amended internet link is the URL.

9. The computer program product of claim 7, wherein the program instructions executable by the processor further cause the processor to:
split the remaining internet link into the list of words based on a Zipf's law.

10. The computer program product of claim 9, wherein a divide-and-conquer algorithm is applied to split the remaining internet link into the list of words, so that a sum of an occurrence probability of each word is maximized, wherein each word is a unigram.

11. The computer program product of claim 9, wherein the Zipf's law is expressed as prob(w)=1/(n*log(N)), where prob(w) is an occurrence probability of word "w," n is a rank of the word "w" in a frequency table, and "N" is the total number of words in the frequency table.

12. A system for detecting a phishing internet link, wherein an internet link is a Uniform Resource Locator (URL) or a domain name, the system comprising:
a processor configured to:
receive the internet link;
identify one or more accent-based non-English characters in the internet link;
look up each identified accent-based non-English character in the Unicode Technical Standard (UTS) to obtain the corresponding correct English character;
replace each of the one or more accent-based non-English characters in the internet link with the corresponding correct English character;
remove a top-level domain from the amended internet link;
remove a common subdomain from the amended internet link;
split the remaining internet link into a list of words;
convert the list of words into a list of word vectors;
calculate an average word vector of the list of word vectors; and
provide a phishing score for the average vector, indicating a probability of the internet link being a phishing internet link,
wherein the step of providing a phishing score for the average vector further configures the processor to:
input the average vector into an SVM classifier to output a distance to a hyperplane;
convert the distance to the hyperplane to a classification probability using Platt scaling; and
provide the phishing score based on the classification probability.

13. The system of claim 12, wherein the processor is further configured to:
split the remaining internet link into a list of words based on a Zipf's law, wherein each word is a unigram, wherein the Zipf's law is expressed as prob(w)=1/(n*log(N)), where prob(w) is an occurrence probability of word "w," n is a rank of the word "w" in a frequency table, and "N" is the total number of words in the frequency table.

14. The system of claim 13, wherein a divide-and-conquer algorithm is applied to split the remaining internet link into the list of words, so that a sum of an occurrence probability of each word is maximized.

15. The system of claim 12, wherein the processor is further configured to:
convert the list of words into the list of word vectors through an unsupervised learning algorithm GloVe.

* * * * *